United States Patent
Tan et al.

(10) Patent No.: US 6,770,687 B1
(45) Date of Patent: *Aug. 3, 2004

(54) WATER-BASED DUAL SECURITY INK

(75) Inventors: Yaoping Tan, Miamisburg, OH (US);
Maurice W. Lewis, Dayton, OH (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/286,386

(22) Filed: Apr. 5, 1999

Related U.S. Application Data

(62) Division of application No. 08/752,986, filed on Nov. 21, 1996.

(51) Int. Cl.⁷ ............................................. C09D 11/00
(52) U.S. Cl. ...................... 523/161; 524/262; 524/265; 524/276; 524/277; 524/501; 524/502; 106/31.14; 106/31.15; 106/31.16; 106/31.32; 106/31.64; 260/DIG. 38
(58) Field of Search .................. 523/161; 260/DIG. 38; 106/31.15, 31.14, 31.16, 31.32, 31.64; 524/262, 265, 276, 277, 501, 502

(56) References Cited

U.S. PATENT DOCUMENTS

| | | | |
|---|---|---|---|
| 3,429,825 A | 2/1969 | Voedisch | 252/301.35 |
| 3,596,275 A | 7/1971 | Sweet | 347/74 |
| 3,663,278 A | 5/1972 | Blose et al. | 428/480 |
| 4,150,997 A | 4/1979 | Hayes | 106/15.05 |
| 4,153,593 A | 5/1979 | Zabiak et al. | 524/110 |
| 4,269,627 A | 5/1981 | Hwang | 186/31.46 |
| 4,315,643 A | 2/1982 | Tokunaga et al. | 503/208 |
| 4,328,332 A | 5/1982 | Hayes et al. | 528/296 |
| 4,403,224 A | 9/1983 | Wirnowski | 346/135.1 |
| 4,687,701 A | 8/1987 | Knirsch et al. | 428/216 |
| 4,894,283 A | 1/1990 | Wehr | 428/341 |
| 5,106,998 A | 4/1992 | Tanaka et al. | 549/331 |
| 5,155,230 A | 10/1992 | Hibino et al. | 548/409 |
| 5,177,218 A | 1/1993 | Fischer et al. | 549/25 |
| 5,206,395 A | 4/1993 | Fischer et al. | 552/201 |
| 5,240,781 A | 8/1993 | Obata et al. | 428/488.4 |
| 5,266,447 A | 11/1993 | Takahashi et al. | 430/345 |
| 5,348,348 A | 9/1994 | Hanada et al. | 283/91 |
| 5,368,334 A | 11/1994 | Christy et al. | 283/67 |
| 5,384,077 A | 1/1995 | Knowles | 252/586 |
| 5,405,958 A | 4/1995 | VanGemert | 544/71 |
| 5,407,885 A | 4/1995 | Fischer et al. | 502/172 |
| 5,426,143 A | 6/1995 | de Wit et al. | 524/206 |
| 5,429,774 A | 7/1995 | Kumar | 252/586 |
| 5,446,151 A | 8/1995 | Rickwood et al. | 544/71 |
| 5,468,581 A | 11/1995 | Coe et al. | 430/22 |
| 5,480,482 A | 1/1996 | Novinson | 106/498 |
| 5,500,040 A | 3/1996 | Fujinami | 522/53 |
| 5,552,231 A | 9/1996 | Talvalkar | 428/484 |
| 5,630,869 A * | 5/1997 | Amon et al. | 106/31.37 |
| 5,667,317 A | 9/1997 | Tan | 400/197 |
| 5,681,379 A | 10/1997 | Talvalkar et al. | 106/31.25 |
| 5,747,176 A | 5/1998 | Talvalkar | 428/484 |
| 5,807,625 A * | 9/1998 | Amon et al. | 428/195 |
| 5,883,043 A * | 3/1999 | Halbrook, Jr. et al. | 503/204 |

FOREIGN PATENT DOCUMENTS

| | | |
|---|---|---|
| EP | 0327788 | 8/1989 |
| GB | 920414 | 3/1963 |
| GB | 2272861 | 6/1994 |

OTHER PUBLICATIONS

Patent Abstracts of Japan, vol. 012, No. 300 (P–745), Aug. 16, 1988 & JP 63 074053A (Mitsubishi Electric Corp), Apr. 4, 1988.

* cited by examiner

*Primary Examiner*—Terrel Morris
*Assistant Examiner*—John J. Guarriello
(74) *Attorney, Agent, or Firm*—Millen, White, Zelano & Branigan, P.C.

(57) ABSTRACT

A water-based security printing ink is provided with two means of security. The use of a variable light absorbing and/or transmitting pigment or dye is a first security and a water repelling agent is provided as a second security. Visible images can be generated from the printed ink upon exposure to UV or infrared light. The water repelling agent renders the image waterproof and differentiates the printed image from the substrate, which allows the image to be detected upon exposure to water or other aqueous mixture. Suitable inks can be used in conventional printing methods, such as jet printing, lithography, offset printing and impact printing. Also provided are substrates imaged with these security printing inks.

16 Claims, 1 Drawing Sheet

WATER-BASED DUAL SECURITY INK

This application is a divisional of copending application Ser. No. 08/752,986 filed on Nov. 21, 1996.

FIELD OF THE INVENTION

The present invention relates to security printing inks used to thwart counterfeiting of printed commercial documents such as sales transaction records and receipts.

BACKGROUND OF THE INVENTION

Many different means of security are available to prevent duplication of printed commercial documents such as special papers (water marked paper) and special inks (fluorescent inks and other optically variable inks) which form latent images or images that change color.

The use of latent images as a security measure is well known. To be useful as a security measure, latent images must be well camouflaged but readily and easily viewable to the user, preferably by a simple procedure. An example of such a latent image is described in U.S. Pat. No. 5,468,581, which is formed when printing documents using an intaglio process. The latent image is overprinted on the visible image such that the latent image is visible when the document is tilted and viewed at an angle. The latent image is caused by the variation of the slight shadow from the raised ink pattern formed by the intaglio process or other printing method which produces raised ink patterns. This technique is not well suited for other printing methods, such as ink jet printing and thermal transfer printing, which do not typically provide raised ink patterns and do not easily incorporate the steps necessary to vary the shadows formed by such raised ink patterns.

Optically variable inks have been used to provide latent images and images which change color when exposed to a light source other than ambient light. Such optically variable inks typically contain a fluorescent compound or photochromic compound which responds to infrared or ultraviolet light. An example of an aqueous printing ink for jet printing which fluoresces under ultraviolet radiation is described in U.S. Pat. No. 4,153,593. The dyes described in this reference are water soluble and include fluorescein, eosine dyes and Rhodamine dyes. Fluorescent pigments and dyes for use in water-based jet printing inks are well known. Representative disclosures include U.S. Pat. No. 4,328,332, issued to Hayes et al. on May 4, 1982, and U.S. Pat. No. 4,150,997, issued to Hayes on Apr. 24, 1979. While the use of fluorescent inks and dyes has been effective and versatile, with the advent of today's personal computers and color copiers, conventional security measures such as these have been overcome, particularly where records are only casually inspected, such as sales receipts and transaction records. Therefore, it is desirable to provide additional security measures to supplement the fluorescent pigments and dyes.

Adding additional security measures is complicated by many factors. One is that there are many types of printing inks with compositions adapted to be employed in particular printing operations. For example, the inks for ink jet printers must be conductive, have viscosity values within a certain range and contain no large particulate matter (below 5 mm) and the ink should not dry within the ink jet over short periods of time.

Jet printing processes are described in Report No. 1722-1 of the Stanford University Electronic Research Laboratory dated March 1964, entitled "High Frequency of Oscillography with Electrostatically Deflected Ink Jets". The basic imaging technique involves the use of one or more ink jet assemblies connected to a pressurized source of ink. Each jet includes a small orifice usually having a diameter in the order of about 0.0024 in. Which is electromagnetically energized to emit a continuous stream of uniform droplets of ink. This stream of droplets is directed onto a moving surface, for example, a moving web of paper and is controlled to form printed characters. (See, for example, U.S. Pat. Nos. 3,596,275; 4,269,627; 4,153,593; 4,328,332; and 4,150,997.)

Inks for thermal transfer printing must have softening/melting points enabling flow and tackiness enabling adhesion to a receiving substrate under the operating conditions of a thermal transfer printer. In thermal transfer printing, images are formed on a receiving substrate by heating extremely precise areas of a print ribbon with thin film resistors. The print ribbon comprises a supporting substrate and a functioning layer or "ink layer". Heating of the localized area causes transfer of the ink layer or functional layer from the ribbon to the receiving substrate. The functional layer or ink layer contains the requisite pigment or dye which enables detection either visually, optically or magnetically. See U.S. Pat. No. 3,663,278, issued May 16, 1972 and U.S. Pat. Nos. 4,315,643; 4,403,224; 4,687,701; and 5,240,781.

Special ink formulations are also employed in relief printing, offset printing, intaglio printing, lithography and silk screening.

Another factor which complicates adding a security measure to a security ink is that water-based inks are preferred to minimize the impact on the environment and avoid flammable vapors during use. This limits the components that can be added to the security ink.

An additional factor which complicates adding a security measure to a security ink is that it is difficult to complement the performance of fluorescent and photochromic pigments and dyes within optically variable inks without interfering with their performance. Parameters such as these place limitations on the additives or other components which can be used with security inks, making it difficult to provide multiple security measures within a security ink.

SUMMARY OF THE INVENTION

It is an object of the present invention to provide a printing ink with two forms of security to prevent counterfeiting.

It is another object of the present invention to provide a water-based security ink with a new security measure for determining counterfeit documents.

It is another object of the present invention to provide a security ink with a security measure for determining counterfeit documents which can complement the use of conventional security measures with optically variable pigments and dyes such as thermochromic, photochromic and fluorescent pigments and dyes.

It is another object of the present invention to provide jet printing inks and other water based inks with two security measures.

It is another object of the present invention to provide an imaged substrate with two modes of security ink with a security mechanism that works in tandem with fluorescent, thermochromic and photochromic pigments and dyes.

Upon further study of the specification and appended claims, further objects and advantages of this invention will become apparent and further understood from the detailed description and claims which follow.

The above objects are achieved through the use of a water-based security printing ink which comprises a water soluble, dispersible or emulsifiable pigment or dye with variable light absorption and/or transmission properties, a carrier for said pigment or dye selected from aqueous solutions and water soluble, dispersible or emulsifiable binders and a water repelling agent in an amount sufficient to render the ink waterproof once dried. This printing ink provides two modes of security, one through the variable light absorption and/or transmission properties and the other through its waterproof properties. Thermal transfer ribbon ink and jet printing ink which contain these two modes of security are included in this invention.

In another aspect of the present invention, there is provided imaged substrates having a waterproof image printed thereon which comprises a water soluble, dispersible or emulsifiable pigment or dye with variable light absorption and/or transmission properties, a water soluble, dispersible or emulsifiable binder for said pigment or dye and a water repelling agent in an amount sufficient to render the image waterproof.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
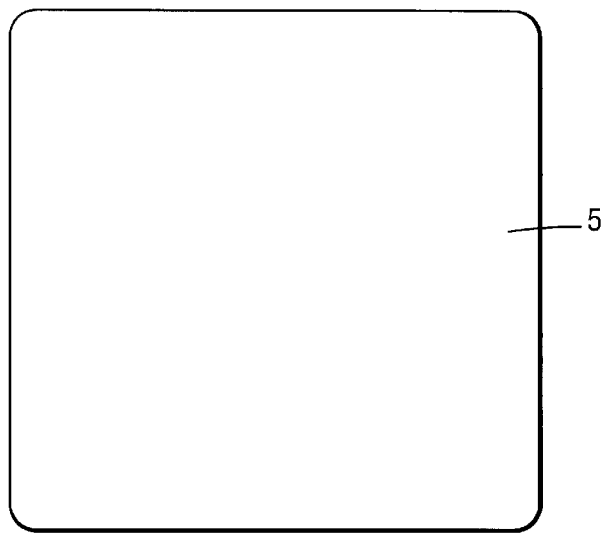
FIG. 1 illustrates an imaged substrate of the present invention having printed thereon a latent image with a security ink of the present invention which is illuminated by a 60 watt incandescent light bulb.

The printing inks provided by the present invention provide two security measures. One is provided through the use of a water soluble, dispersible or emulsifiable pigment or dye with variable light absorption and/or transmission properties, referred to herein as "optically variable" pigments and dyes. These pigments or dyes typically do not absorb or transmit light under ambient conditions (light and temperature), i.e., are invisible to the naked human eye but do absorb or transmit light when exposed to heat, UV light or infrared light. Pigments and dyes which transmit or absorb light under ambient conditions and absorb or transmit light at different wavelengths when exposed to heat, ultraviolet or infrared light can also be used. The pigments and dyes used are soluble, dispersible or emulsifiable in water to provide "water-based" formulations.

Suitable pigments and dyes include the fluorescent resins produced in U.S. Pat. No. 4,328,332 from trimellitic anhydrides and propylene glycol with a zinc acetate catalyst. Representative of water soluble fluorescent dye components are fluorescein and eosine dyes and blaze orange 122-8524A, manufactured by Dayglo Color Corporation of Cleveland, Ohio. The pigment or dye employed will depend on the intended use of the ink. Inks used in jet printing cannot contain large pigment particles or other solids in that they will clog the small orifices of the jet. Other water based printing inks do not suffer from such a limitation and can contain pigments of a relatively large particle size. The amount of dye or pigment can range from 2–50 wt. % based on dry components, preferably 10–50% by weight based on dry components.

Photochromic compounds which change color when exposed to UV light or infrared light can be used. Suitable photochromic compounds include the spiro compounds of formula V disclosed by Takahashi et al. in U.S. Pat. No. 5,266,447. These include spiroxazine compounds, spiropyran compounds and thiopyran compounds of the formulae in columns 5–6 of U.S. Pat. No. 5,266,447. Other examples of suitable photochromic compounds include the benzopyran compounds disclosed by Kumar in U.S. Pat. No. 5,429,774, the benzothioxanthone oxides disclosed by Fischer et al. in U.S. Pat. No. 5,177,218, the dinitrated spiropyrans disclosed by Hibino et al. in U.S. Pat. No. 5,155,230, the naphthacenequinones disclosed by Fischer et al. in U.S. Pat. No. 5,206,395 and U.S. Pat. No. 5,407,885, the naphthopyran compounds disclosed by Knowles in U.S. Pat. No. 5,384,077, the spiro(indoline) naphthoxazine compounds disclosed by VanGemert in U.S. Pat. No. 5,405,958, the ring compounds disclosed by Tanaka et al. in U.S. Pat. No. 5,106,988 and the spiro-benzoxazine compounds disclosed by Rickwood et al. in U.S. Pat. No. 5,446,151. Mixtures of such compounds are preferred and are available commercially from sources such as Color Change Corp. of Schaumburg, Ill. and Xytronyx Inc. of San Diego, Calif.

Suitable thermochromic inks include those described in U.S. Pat. Nos. 5,500,040; 5,480,482; and 5,426,143.

The pigments and dyes which emit or absorb light when exposed to UV light are preferred and those which are most preferred do not absorb, emit or reflect ambient light and are transparent under ambient indoor conditions.

The concentration of the dye or pigment material within jet printing inks can vary over fairly wide limits, depending on a particular materials employed in combination therewith. In general, fluorescence can be developed with a fluorescent dye component is present in an amount which ranges from 2–50 wt. % and preferably in an amount within the range of 10 to 50 wt. %, based on dry components.

The security printing inks of the present invention also comprise carriers for the dye or pigments. The carriers can comprise an aqueous solution and/or a water soluble, dispersible or emulsifiable binder. Such properties are essential to providing a water-based ink. The aqueous solution preferably contains a dispersing agent to help solubilize the pigment or dye. Alkaline solutions will disperse these pigments with amines being preferred.

The components of the binders can vary widely and are dependent on the end use. In thermal transfer printing, the ink is deposited on a supporting substrate as a solid layer and is preferably free of solvent. To provide for transfer from the supporting substrate to a receiving substrate during printing, the ink must achieve flow and adhere to the receiving substrate. Therefore, a combination of components, typically a wax and thermoplastic resin, are employed to provide the flow and adhesion necessary to achieve transfer. In contrast, in jet printing, the ink must have a low viscosity preferably between 1–10 centipoise. Most preferably between 2–6 centipoise. Low viscosity polymer resins such as those described in U.S. Pat. No. 4,328,332 are suitable. Typically low to medium molecular weight polymeric materials which do not interfere with the optically variable pigment or dye in response to ultraviolet radiation or other stimulus, can be used. Representative of such resins are styrene-acrylic copolymers of the type manufactured by S. C. Johnson & Co. under the trade name "Joncryl 60" and "Joncryl 70", polymeric materials formed of styrene and maleic anhydride; polyvinyl pyrrolidones, hydroxyethyl cellulose and hydantoin-formaldehyde resins of the type described by Voedisch in U.S. Pat. No. 3,429,825, issued Feb. 25, 1969. The amount of polymeric binder must be consistent with the limitations imposed on viscosity and the conductivity of the ink.

For the other water based inks of this invention, the binder preferably comprises a water soluble, emulsifiable or dispersible wax and/or a water soluble, emulsifiable or dispersible thermoplastic resin. The waxes can be natural waxes, including Carnauba wax, candillila wax, beeswax, rice bran wax, petroleum waxes such as paraffm wax, synthetic hydrocarbon waxes such as low molecular weight polyethylene and Fisher-Tropsch wax, higher fatty acids such as myristic acid, palmitic acid, stearic acid and behenic acid; higher aliphatic alcohols such as steryl alcohol and esters such as sucrose fatty acid esters. Mixtures of waxes can also be used. The preferred waxes are Carnauba wax under the Slip-Ayd series of surface conditioners by Daniel Products and low molecular weight polyethylene. The melting point of the wax typically falls within the range of from 75° C. to 250° C., preferably from 75° C. to 200° C. Waxes with higher melting points are advantageous in that they aid the integrity of the printed image. The amount of wax used is typically greater than 5 wt. % and is preferably from 10–50 wt. %. Coating formulations typically comprise from 20–50 wt. % total solids. This translates to at least 0.1 to 0.2 wt. % wax based on the total formulation. Preferred formulations have from 2–25 wt. % wax based on the total formulation. To aid in the dispersion of the wax within an aqueous medium, micronized grades of wax are preferred.

Suitable water soluble, dispersible or emulsifiable thermoplastic resins include those described in U.S. Pat. Nos. 5,240,781 and 5,348,348. Specific examples include the following: polyvinyl chloride, polyvinyl acetate, vinyl chloride-vinyl acetate copolymers, polyethylene, polypropylene, polyacetal, ethylene-vinyl acetate copolymer, ethylenealkyl(meth)acrylate copolymer, ethylene-ethylacetate copolymer, polystyrene, styrene copolymers, polyamide, ethylcellulose, epoxy resin, polyketone resin, polyurethane resin, polyvinylbutyrl, styrenebutadiene rubber, nitrile rubber, acrylic rubber, ethylene-propylene rubber, ethylene alkyl(meth)acrylate copolymer, styrenealkyl(meth)acrylate copolymer, acrylic acid-ethylene-vinylacetate terpolymer, saturated polyesters and sucrose benzoate. Preferred resins include sucrose benzoate, polyethylene, polyketone resins and styrene copolymers. To obtain emulsions of thermoplastic resins which are insoluble or partially soluble in water, the thermoplastic resin is typically ground to submicron size.

The binders may comprise two or more resins to provide specific property profiles. For example, Piccotex 100 resins by Hercules is a styrene copolymer (vinyl toluene-a-methylstyrene copolymers) that provides high hot tack properties which aid adhesion of the coating to the receiving substrate upon transfer. Polyethylene SL300 is a polyethylene resin emulsion of a small (submicron) particle size within the Slip-Ayd series by Daniel Products which provides slip or wax-like properties for transfer. Thermoplastic resins typically enhance the integrity of the printed image; i.e., they enhance the smear and scratch resistance. Thermoplastic resins typically have a melting point of less than 300° C. and preferably in the range of 95° C. to 250° C. The amount of thermoplastic resin can range from 15–35 wt. %, and preferably comprises at least 25 wt. % of the formulation, based on the total dry ingredients.

A key component of the inks provided by this invention is a water repelling agent. This water repelling agent provides a second security for the printed matter obtained. The water repelling agent is used in an amount sufficient to render the dry ink waterproof, preferably with a surface tension less than 35 dynes, preferably between 20–30 dynes. Water has a surface tension of 70 dynes. In being waterproof, the image will surface when the printed matter is wet with water or other aqueous solution. The printed image will not absorb water forming beads thereon and due to the distinct surface tension from the substrates, the application of water will render the image visible. A convenient method for exposing the image is to pass a water soluble ink such as in a felt marker over the image.

Suitable agents which will render the dry ink waterproof include homopolymers of acrylic acids or a lower alkyl acrylic acids which are soluble in alkaline aqueous solution but insoluble when dry. Other agents include vinyl emulsions of pentaerythritol, dicyananide and in monosodium phosphate. An acrylic polymer suitable for forming such a film is that available from Morton Chemical Company under the trade name LUCIDENE 303® which is a mixture of 65% acrylic polymer dissolved in 35% isopropanol. Amounts of from 2–7 wt. % may be used based on the total ink composition. Alternatively, Latex 744b, commercially available from the Dow Chemical Company, may be used in an amount from 0.5–3.0% by weight of the ink composition. Latex 744b is believed to be a vinyl in water emulsion which contains pentaerythritol, dicyanamide and monosodium phosphate. Other suitable water repelling materials include varnishes and silicone resins. Suitable silicone resins include polydimethylsiloxanes such as those available from General Electric Company and Dow Coming Incorporation. Suitable examples include those polydimethylsiloxanes under the trade names "SE30" and "VISC-100M" provided by General Electric Company and Silastic 4-2901 and Silastic 4-2903 provided by Dow Coming Incorporation. The amount employed preferably ranges from about 1–10 wt. % based on the weight of dry components and most preferably ranges from 2–10 wt. %. The water repelling agent should provide a dried ink with a surface tension less than 35 dynes, preferably from 20–30 dynes. This will cause sufficient differentiation with the substrate, which typically has a surface tension of 50–60 dynes to reveal the image once wetted with water or other aqueous mixture.

The inks of the present invention may contain additional components to aid in their performance as a security ink. The nature of these additives will depend on the end use. A suitable additive is a water soluble fluorescent brightener component that is used in combination with the fluorescent dye materials. The brightener typically enhances the fluorescence available from the same concentration of dye. For example, fluorescein (acid yellow 73) is an excellent fluorescent material having a peak fluorescence of 527 nm as measured by a Perkin Elmer 240 Fluorescent Spectrophotometer. Fluorescein can absorb only a given amount of ultraviolet light emitted from a standard mercury vapor light at 365 nm. However, the fluorescent brightener also absorbs energy at 365 nm and re-emits the light at 460 nm. This emission is very close to the peak absorption of fluorescein so that the net effect is fluorescein acts as if it is being radiated by a light of greater flux than is actually produced. Fluorescence can be increased by as much as five times the original value with the use of a fluorescent brightener. Care should be exercised to avoid the use of a brightener having an absorption curve which interferes with the fluorescence of the fluorescent material. Examples of brighteners include Calcofluor ABT by Cyanamid, Calcofluor A2RT by Cyanamid, Blancophor SV by GAF, Tinopal GS by Geigy, Leucophon BSW by Sandoz, Paper White SP by DuPont and Paper White BP by DuPont.

Other suitable additives desired for jet ink printing are those which reduce foaming (surfactants) such as Anti-Musal JIC and those which reduce bacterial growth (Towisyl 75). Both can be significant problems if not in check. Other suitable additives desired for ink jet printing may be viscosity modifiers and those which provide wettability (butylcarbitol). Chelating agents may be added such as EDTA to prevent precipitation of metal ions dissolved in the water which can reduce shelf life.

Ammonium hydroxide and sodium hydroxide help render fluorescent pigments soluble in water by forming a quaternary salt. A pH close to 8.0 is preferred. Morpholine functions to retard the hydrolysis of the salt (ammonium hydroxide). A humectant may be added to prevent the composition from drying out within the print head. Polyethylene glycols are suitable humectants.

The inks may also contain additives which vary their utility. For example, the inks may contain conventional sensible material to render the printed images visible under ambient indoor conditions. Suitable sensible materials include conventional dyes and colored pigments such as carbon black, phthalocyanine dyes, cadmium, primrose, chrome yellow, ultramarine blue, iron oxide, cobalt oxide, nickel oxide and the like are suitable. These additional sensible materials can typically comprise from 0.5–50% by weight, preferably 1–10% by weight of the total dry ingredients in the case of thermal transfer ribbons.

In the case of other water soluble inks, additional components may include plasticizers such as those described in U.S. Pat. No. 3,663,278 to aid in processing of the thermal transfer layer. Suitable plasticizers include adipic acid esters, phthalic acid esters and ricinoleate acid esters, citrates, epoxies, glycerols, glycols, hydrocarbons and chlorinated hydrocarbons, phosphates and the like. Other suitable additives include oil, weatherability improvers such as UV light absorbers, flexibilizers (oil) and fillers.

The thermal transfer ribbons which contain a dual security ink of the present invention can be prepared by conventional means wherein an ink coating formulation is applied to a substrate using a Myer rod or like wire-round doctor bar set up on the typical solvent coating machine to provide a coating of a conventional thickness. A temperature of approximately 100–150° F. is maintained, if necessary, during the coating process. Once applied, the substrate is passed through a drier at elevated temperature to ensure drying and adherence of the coating onto the substrate. Such thermal transfer layers can typically be fully transferred to a receiving substrate at temperatures in the range of 150–300° C. and provide all the advantages of thermal printing.

The ink coating formulation used to form the thermal transfer ribbons typically contains solids in an amount ranging from 20–55 wt. %, preferably 25–40 wt. % solids. To provide these formulations, the components are typically combined as dispersions at about 30 wt. % solids in ball mill or similar conventional grinding equipment and agitated and ground. The wax emulsion is typically the initial material and the remaining components are added thereto with minor heating.

Without further elaboration, it is believed that one skilled in the art can, using the preceding description, utilize the present invention to its fullest extent. The entire disclosure of all applications, patents, publications, cited above and below, are herein incorporated by reference.

EXAMPLES

Example 1

An ink composition is prepared by combining the following in aqueous solution:

5 to 30 wt. % UV fluorescent pigment from BASF, 5 to 20 wt. % water soluble polydimethyl siloxane and 30 to 80 wt. % varnish, all based on total solids.

Example 2

Preparation of Security Paper

An ink composition of Example 1 is printed on a roll of cash register paper about 2¼" wide. The image printed is the logo for NCR Corporation. A substrate with a latent image is produced, a sample of which is represented in FIG. 1. The sample of imaged substrate 5 in FIG. 1 is shown as illuminated under ambient indoor conditions wherein the latent image is invisible to the naked human eye.

Security Test

Figure 2:
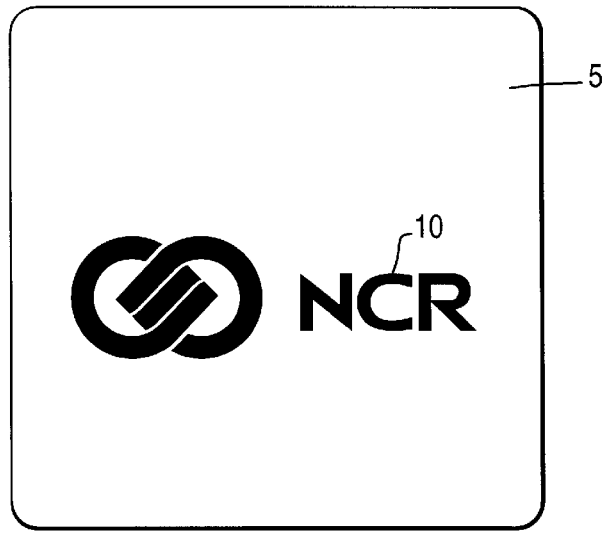
FIG. 2 illustrates an imaged substrate of the present invention as in FIG. 1 which is illuminated under ultraviolet light.
Figure 3:
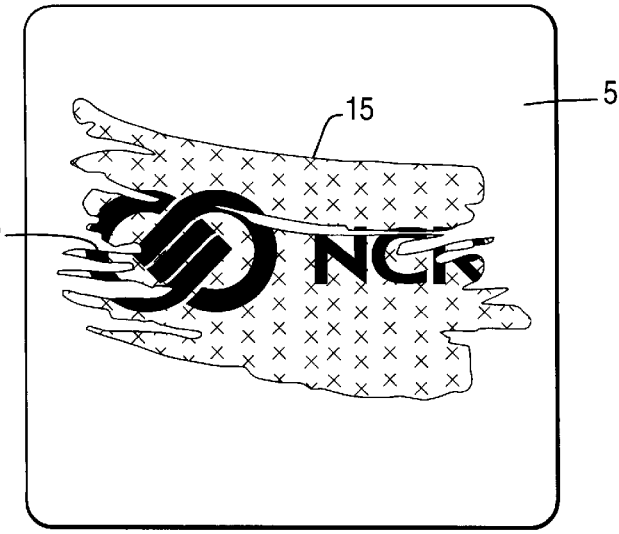
FIG. 3 illustrates an imaged substrate of the present invention as in FIG. 1, wherein the latent image is overwritten with a felt marker with a water soluble ink.

Imaged substrate 5 produced in Example 2 is tested for luminescence and for waterproofness. FIG. 2 shows imaged substrate 5 illuminated with a UV light from a mercury arc lamp operating at 365 nm to fully reveal latent 10 and FIG. 3 shows imaged substrate 5 with the latent image 10 passed over with a highlight pen (pink) to form overwriting 15 and reveal the image by the differentiation in water absorption between the latent image 10 and the substrate.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A water-based security printing ink which is water proof once dried, and which comprises:

(a) a water soluble, dispersible or emulsifiable pigment or dye (b) a carrier for said pigment or dye selected from the group consisting of aqueous solutions and water soluble, dispersible or emulsifiable binders; and (c) a water repelling agent dispersed in the carrier (b) in an amount sufficient to render the ink water proof once dried, wherein the water soluble, dispersible or emulsifiable pigment or dye is selected from thermochromic, photochromic and fluorescent pigments and dyes.

2. A water-based security printing ink as in claim 1, wherein the photochromic dyes and pigments are selected from the group consisting of:

spiroxazine compounds, spiropyran compounds, thiopyran compounds, naphthbenzopyran compounds, spiro(indoline)naphthoxazine compounds, spirobenzoxazine compounds and derivatives thereof, benzothioxathone compounds, and naphthacine quinone compounds and mixtures of such compounds, and wherein the fluorescent dyes and pigments are selected from fluorescein and eosine dyes.

3. A water-based security printing ink as in claim 1, wherein the amount of water soluble, dispersible or emulsifiable pigment or dye ranges from 2 wt % to 50 wt. % based on dry components.

4. A water-based security printing ink as in claim 1 which is colorless under ambient indoor light.

5. A water-based security printing ink as in claim 1 which is colored under ambient indoor light and additionally contains a water soluble, dispersible or emulsifiable colored pigment.

6. A water-based security printing ink as in claim 1, wherein the water repelling agent is selected from the group consisting of varnishes, vinyl emulsions, polysiloxanes and acrylic polymers which are insoluble in water when dry.

7. A water-based security printing ink as in claim 6, wherein the water repelling agent is selected from homopolymers of acrylic acid (lower alkyl) acrylic acids and polydimethylsiloxane.

8. A water-based security printing ink as in claim 1, wherein the amount of water repelling agent ranges from 1–10 wt. % based on the weight of dry compounds.

9. A water-based security printing ink as in claim 1, wherein the water repelling agent provides a dried ink with a surface tension less than 35 dynes.

10. A water-based security printing ink as in claim 1, which is an ink jet printing ink wherein the carrier comprises water and a dispersing agent for said water soluble, dispersible or emulsifiable dye or pigment.

11. A jet printing ink which is waterproof when dry, comprising an aqueous solution as a carrier and a water soluble, emuslsifiable, or dispersible dye or pigment selected from fluorescent, photochromic and thermochronic pigment and dyes in an amount of 2 to 50 wt. % based on dry components and a water repelling material selected from the group consisting of varnishes, vinyl emulsions, arcrylic resins and silicone resins, in an amount of 1–10 wt. % based on dry components.

12. A jet printing ink as in claim 11, which additionally comprises an alkaline agent which solubilizes the dye or pigment.

13. A jet printing ink as in claim 12, wherein the alkaline agent is an amine.

14. A jet printing ink as in claim 11, wherein water repelling agent provides a dried ink with a surface tension from 20–90 dynes.

15. A jet printing ink as in claim 11 which additionally comprises a humectant and a colored pigment.

16. A jet printing ink as in claim 11, which provides a transparent image under ambient conditions.

* * * * *